(12) United States Patent
Cooray et al.

(10) Patent No.: US 9,116,729 B2
(45) Date of Patent: Aug. 25, 2015

(54) HANDLING OF BINARY TRANSLATED SELF MODIFYING CODE AND CROSS MODIFYING CODE

(71) Applicant: Intel Corporation, Santa Clara, CA (US)

(72) Inventors: Nirajan L. Cooray, Folsom, CA (US); David Keppel, Seattle, WA (US); Naveen Kumar, San Jose, CA (US); Ori Lempel, Ramot Menashe (IL); Michael Neilly, Cupertino, CA (US); Naveen Neelakantam, Mountain View, CA (US); H. Peter Anvin, San Jose, CA (US); Sebastian Winkel, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/997,694

(22) PCT Filed: Dec. 27, 2012

(86) PCT No.: PCT/US2012/071880
§ 371 (c)(1),
(2) Date: Jun. 25, 2013

(87) PCT Pub. No.: WO2014/105030
PCT Pub. Date: Jul. 3, 2014

(65) Prior Publication Data
US 2014/0189659 A1    Jul. 3, 2014

(51) Int. Cl.
*G06F 9/455*    (2006.01)
*G06F 12/10*    (2006.01)

(52) U.S. Cl.
CPC ................ *G06F 9/45525* (2013.01)

(58) Field of Classification Search
None
See application file for complete search history.

(56) References Cited

U.S. PATENT DOCUMENTS

| | | | |
|---|---|---|---|
| 6,199,152 B1 | 3/2001 | Kelly et al. | |
| 6,363,336 B1 | 3/2002 | Banning et al. | |
| 6,594,821 B1 | 7/2003 | Banning et al. | |
| 6,704,925 B1 * | 3/2004 | Bugnion | 717/138 |
| 7,096,460 B1 | 8/2006 | Banning et al. | |
| 7,107,580 B2 * | 9/2006 | Zemach et al. | 717/136 |
| 7,296,261 B2 | 11/2007 | Witchel et al. | |
| 7,404,181 B1 | 7/2008 | Banning et al. | |
| 7,774,746 B2 | 8/2010 | Mansfield et al. | |
| 7,822,924 B2 * | 10/2010 | Woffinden et al. | 711/125 |
| 7,904,891 B2 | 3/2011 | Banning et al. | |

(Continued)

OTHER PUBLICATIONS

International Searching Authority, "Notification of Transmittal of the International Search Report and the Written Opinion of the International Searching Authority," mailed Jul. 29, 2013, in International application No. PCT/US2012/071880.

*Primary Examiner* — Don Wong
*Assistant Examiner* — Devayani R Talukdar
(74) *Attorney, Agent, or Firm* — Trop, Pruner & Hu, P.C.

(57) ABSTRACT

A processor includes a processor core to execute a first translated instruction translated from a first instruction stored in first page of a memory. The processor also includes a translation indicator agent (XTBA) to store a first translation indicator that is read from a physical map (PhysMap) in the memory. In an embodiment, the first translation indicator is to indicate whether the first page has been modified after the first instruction is translated. Other embodiments are described as claimed.

24 Claims, 10 Drawing Sheets

(56) References Cited

U.S. PATENT DOCUMENTS

| | | | |
|---|---|---|---|
| 2003/0093775 A1* | 5/2003 | Hilton | 717/138 |
| 2004/0015675 A1* | 1/2004 | Kyker et al. | 711/207 |
| 2010/0030975 A1* | 2/2010 | Murray et al. | 711/154 |
| 2010/0332808 A1 | 12/2010 | Adl-Tabatabai et al. | |
| 2012/0023307 A1 | 1/2012 | Morris | |
| 2012/0117355 A1* | 5/2012 | Campbell et al. | 711/206 |

* cited by examiner

HANDLING OF BINARY TRANSLATED SELF MODIFYING CODE AND CROSS MODIFYING CODE

TECHNICAL FIELD

The field of the invention is handling of binary translated self modifying code and cross modifying code.

BACKGROUND

A processor core may be designed to execute code written in a particular coding language. In order to have a program executed by a particular core, program code may need to be translated from a first coding language that is incompatible with the particular core to a second coding language that is compatible with the particular core, known as binary translation.

Self modifying code (SMC) refers to code that becomes modified during execution, e.g., one or more instructions of the SMC upon execution modify other instructions of the SMC. Cross modifying code (XMC) refers to first code that is executable on a first processor core and that when executed causes modifications to second code that is executable on a second processor core. SMC or XMC may be partially translated or entirely translated prior to execution. Translation of several instructions prior to their execution may introduce anomalies in the translated code, as compared with translation and execution of each instruction prior to advancement to the next instruction. The anomalies in the translated code can result in mistakes in output.

DETAILED DESCRIPTION

In various embodiments, methods and apparatus are provided to execute translated code that includes SMC or XMC.

In one embodiment, a processor includes a core to execute a translated first instruction that is translated from a first instruction stored in a page of a memory. The core also includes a translation indication agent (XTBA), e.g., a dedicated cache memory to store a first translation indicator that is to indicate that whether contents of the page have been modified after translation of the first instruction is complete.

Figure 1:
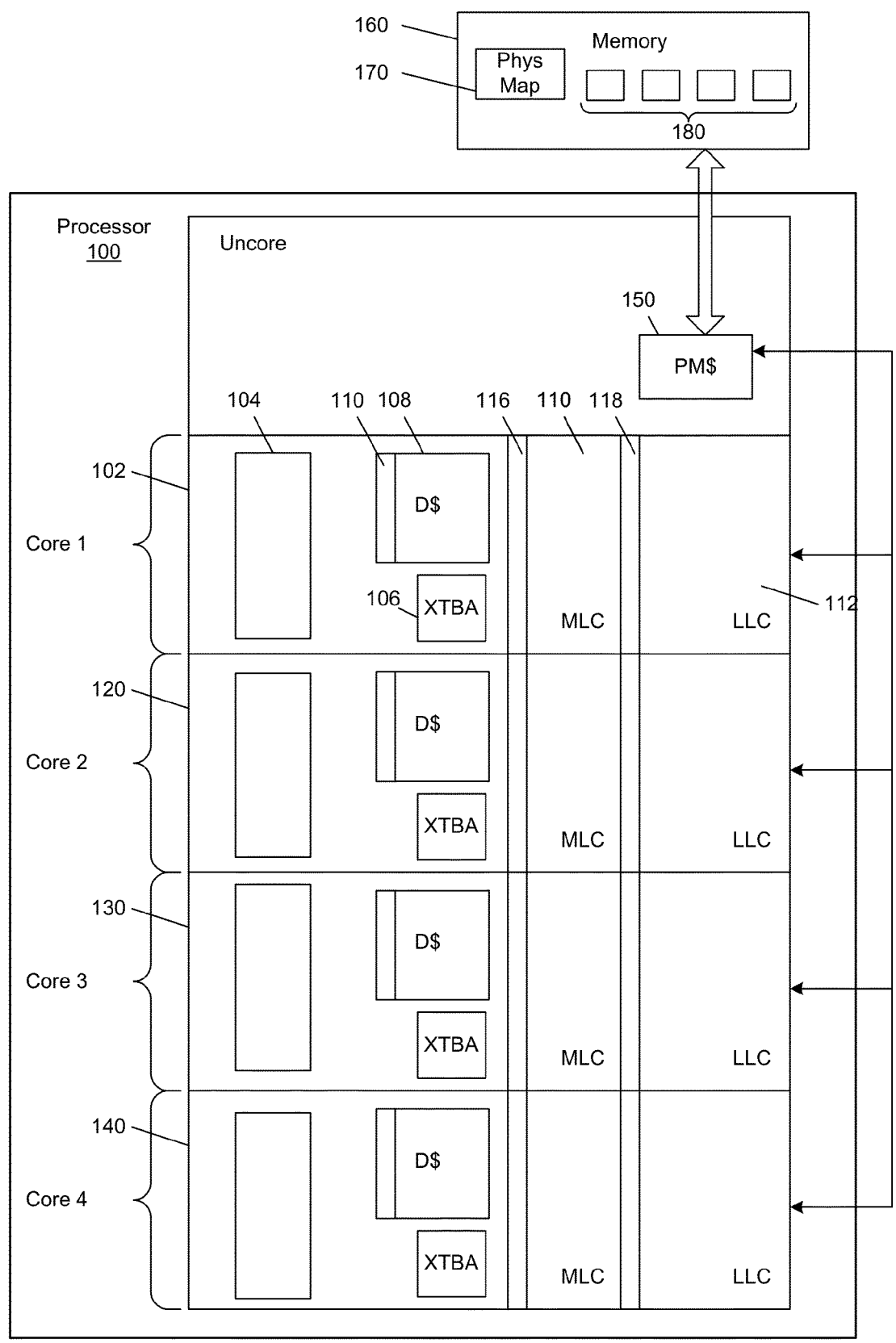
FIG. 1 is a block diagram of a processor that includes a plurality of processor cores in accordance with an embodiment of the present invention.

Referring now to FIG. 1, shown is a block diagram of a processor 100 that includes a plurality of cores in accordance with an embodiment of the present invention. In an embodiment, the processor 100 may include cores 102, 120, 130, and 140. The core 102 may include an execution unit 104 to execute instructions that may be stored in a cache memory or that may be retrieved from a system memory 160 (e.g., a dynamic random access memory (DRAM)), an XTBA 106 to store one or more translation indicators, a first level data cache (D$) 108, a second (middle) level data cache (MLC) 110, and a third (last) data level cache (LLC) 112. Each of the cores 120, 130, and 140 may have a corresponding XTBA and a corresponding first level cache, second level cache, and third level cache.

Each core 102, 120, 130, 140, may be coupled to a physical map cache (PM$) 150 that is to store a plurality of translation indicators. The PM$ 150 may include a portion of entries copied from a physical map (PhysMap) 170 of translation indicators, each translation indicator in the PhysMap 170 associated with a corresponding page of a plurality of pages 180 in the memory 160. For example, the translation indicator associated with page A and stored in the PhysMap 170 may indicate whether a first instruction stored in page A has been translated to a first translated instruction, e.g. from a first coding language to a second coding language. The first translated instruction may be stored in another page of the system memory 160.

In operation, the XTBA 106 may store the first translation indicator corresponding to page A and associated with the first translated instruction. The first translation indicator may have been retrieved from, e.g., the PM$ 150, or from the PhysMap 170, based on, e.g., tag information of the first translated instruction. In an example, the first translation indicator in the XTBA 106 may have a value of 1, and indicates that translation of the first instruction has occurred.

If page A is modified subsequent to translation of the first instruction to the first translated instruction, the value of the translation indicator may be updated from 1 to 0 to indicate that page A has been modified subsequent to translation of the first instruction. If page A has been modified subsequent to the translation, the translated first instruction may be deemed stale, e.g., the first translated instruction is treated as if it is no longer a valid instruction. While it is possible that the first instruction has not been altered when page A is modified, in this embodiment the granularity of the translation indicator map is one translation indicator per page. Hence, a modification to page A is treated as if the first instruction has been modified. In response to identification of the first translated instruction as stale, the core may abort execution of the first translated instruction.

During execution of the first translated instruction, the XTBA 106 is configured to monitor the value of the translation indicator associated with page A and stored in the PhysMap 170. If the first translation indicator in the PhysMap 170 is updated from a value of 1 to a value of 0 as a result of, e.g., execution of a STORE instruction to an address within page A at any time between a start of execution of the translated first instruction and completion of the execution ("commit"), the execution of the first translated instruction may be aborted.

The XTBA 106 may be physically tagged to enable snooping of updates to the PhysMap 170. An update to the PhysMap 170 can result in generation of snoops to all XTBAs in the system 100. The generated snoops can act to alert each of the XTBAs that the first translated instruction is stale and that execution of the first translated instruction is to be halted in each core that is executing the first translated instruction.

Each cache line of each of the data caches 108, 110, and 112 in the core 102 is to store data (and similarly for the data caches in cores 120, 130, and 140), e.g., operands retrieved from one or more pages of the memory 160. In an embodiment, each cache line can include a translation indicator that is added to a tag portion of the cache line, depicted as an added column 114, 116, and 118 in each of the cache memories 108, 110, and 112, respectively. The translation indicator within a cache line may be copied from the PhysMap 170 or from the PM$ 150. The translation indicator of a given cache line may be associated with a particular page in memory 160 from which data in the cache line has been loaded.

In operation, an operand may be retrieved from page A of the memory 160 and may be stored in a first cache line of the cache memory 108 within the core 102. Because source page A includes code that has been translated and page A has not been subsequently altered, the translation indicator associated with page A has a value indicative of translation (e.g., value of 1). If a translated instruction to be executed by the core 102 includes a STORE that is to be executed on the operand in the first cache line, the translation indicator value in the cache line indicates to the core 102 that execution of the STORE would result in a conflict, e.g., modification of a source page of a translated instruction. Consequently, a fault may be generated and execution control may be transferred to a handler that halts the STORE from execution. All translated instructions originating from code stored in page A may be invalidated. After execution of the STORE on the operand via the handler, subsequent program instructions may be re-translated or otherwise handled.

Figure 2:
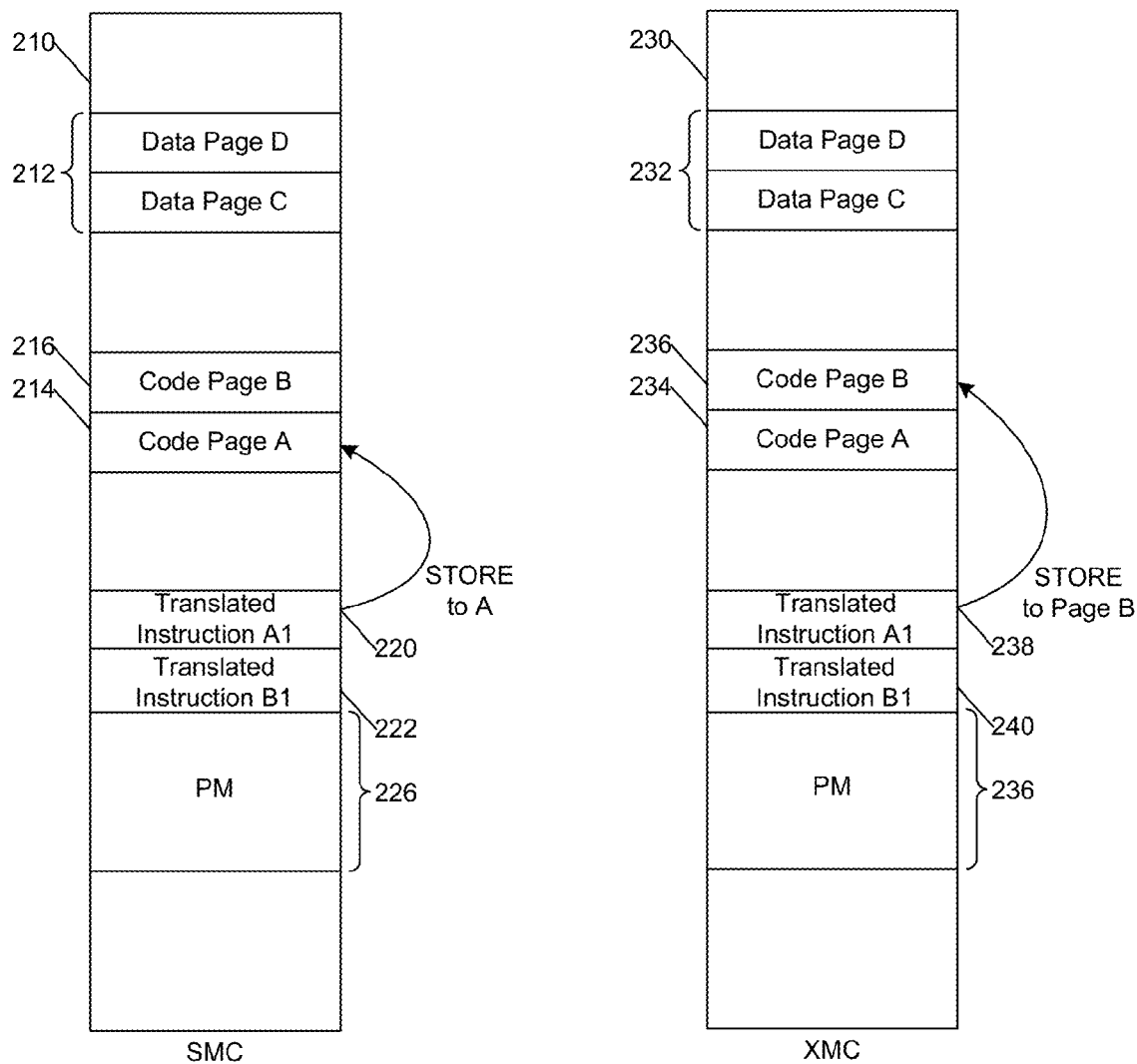
FIG. 2 includes block diagrams of a portion of a memory storing code in accordance with embodiments of the present invention.

Referring now to FIG. 2, shown are block diagrams of two embodiments of a memory portion of a memory storing code and data in accordance with embodiments of the present invention. The memory portion may be included in the system memory 160 of FIG. 1.

In one embodiment, the memory portion 210 includes data pages C and D 212, code page A 214, code page B 216, line 220 to store translated instruction A1, line 222 to store translated instruction B1, and translation indicator physical map (PhysMap) 226. Page A 214 may include first self modifying code (SMC) that is translated to translated code that includes the translated instruction A1 and stored in line 220. Page B 216 may include second SMC that may be translated to translated instruction B1 and stored in line 222. The PhysMap 226 is to store translation indicator values of pages including data pages C and D 212 and code pages A 214 and B 216. The data pages 212 each have translation indicator values that indicate that no translation of contents of the data pages 212 has occurred, and the code pages 214 and 216 each have corresponding translation indicator values to indicate that instructions in pages 214 and 216 have been translated. In one example, a translation indicator value of 1 is associated with translation of an instruction, and a value of 0 is associated with no translation. Other embodiments may use different values to indicate translation or no translation of an instruction.

In operation, the translated instruction A1 in line 220 may include a STORE instruction (e.g., a micro-op (pop)) that is to be executed on an operand, e.g., store a register contents to an address in page A 214. Because execution of the STORE instruction would change contents of page A 214, the core to execute the STORE may generate a fault prior to the execution of the STORE based on the translation indicator associated with the operand, and execution control may be transferred to a handler to update or invalidate the translated instruction A1. That is, because the translation indicator in the tag portion of the cache line can indicate to the core that code within page A has been translated, executing the STORE would change the source page of the translated instruction. The fault may trigger an update in PhysMap 170 (e.g., via a WRITE to PhysMap 170) of the translation indicator associated with code page A 214, e.g., from a value of 1 to a value of 0 to indicate that the translated instruction A1 is stale, and that a re-translation is to occur after the STORE is executed.

In another embodiment, a memory portion 230 includes data pages C and D 232, code page A 234 and code page B 236, translated code lines 238 and 240, and translation indicator physical map PhysMap 236. Lines 238 and 240 may store translated instructions A1 and B1, respectively, which may have been translated from cross modifying code (XMC) in code page A 234 and page B 236, respectively. The PhysMap 236 is to store translation indicator values of pages of the memory 230 including translation indicator values of code pages A 234 and B 236, each with an associated translation indicator to indicate that code in pages 234 and 236 have been translated. The data pages 232 each have associated translation indicator values of 0 to indicate no translation of contents of the data pages 232.

In operation, a first core (core 0) may execute the translated instruction A1 and a second core (core 1) may execute the translated instruction B1. The translated instruction A1 may include a STORE instruction to code page B 236 that upon execution by core 0, would modify contents of code page B 236. During execution of translated instruction A1, core 0 may detect a conflict based on a T-value of 1 associated with code page B 236 (to indicate that code stored in code page B has been translated), which may cause core 0 to generate a fault. Control may be transferred to a handler to update the PhysMap 236 (e.g., via execution of a WRITE), to update the translation indicator associated with page B, and also to update a cache line translation indicator in a cache line containing the operand of the STORE instruction.

The update to the PhysMap 236 may cause snoops to be generated to all XTBAs in the system, including to an XTBA in a core 1 that is executing the translated instruction B1. Because the translated instruction B1 is being executed, the XTBA of core 1 may store a translation indicator value associated with code page B. Update of the translation indicator value in the XTBA of core 1 from a first value to a second value can indicate to the core 1 that translated instruction B1 is stale, causing execution of the translated instruction B1 to abort.

In another embodiment (not shown), an Input/Output (I/O) unit may modify the code page A 234 via Direct Memory Access (DMA). Modification of the code page A can trigger a WRITE to the PhysMap 236 to update the associated translation indicator value associated with page A 234 that indicates that code in page A has been modified subsequent to translation of an instruction in page A. The updated value of the associated translation indicator can generate snoops to all XTBAs of the system, resulting in one or more faults associated with execution of translated instruction A1. Consequently, the execution of the translated instruction A1 may be aborted in each core executing the translated instruction A1.

Figure 3:
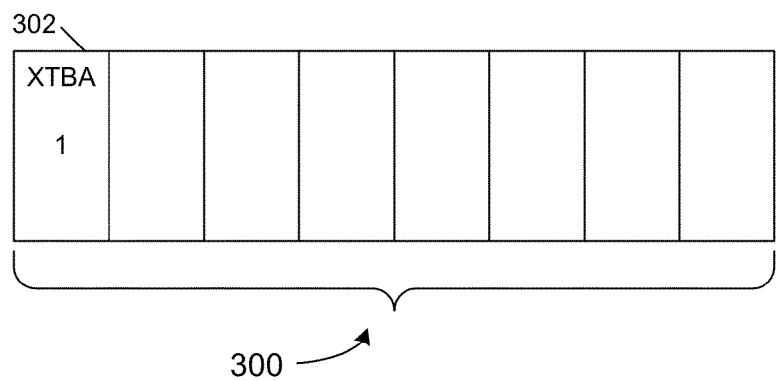
FIG. 3 is a block diagram of a translation indicator agent (XTBA), in accordance with an embodiment of the present invention.

Referring now to FIG. 3, shown is a block diagram depicting a translation indicator agent (XTBA) 300 in accordance with an embodiment of the present invention. The XTBA 300 may include a plurality of storage bits including storage bit 302. Each storage bit is configured to store a translation indicator value associated with a currently executing instruction or recently executed instruction, and each translation indicator value is also associated with a corresponding page of a memory from which the currently executing instruction was translated. A storage bit of the XTBA 300 may be loaded from, e.g., a translation indicator cache such as PM$ 150 of FIG. 1, or may be loaded from a physical map of translation indicators associated with pages of the memory, such as Phys-Map 170 of FIG. 1.

In an embodiment, XTBA 300 can act to monitor a status of a translated instruction in execution. For example, upon start of execution of translated instruction A1, a translation indicator associated with page A (containing the corresponding untranslated instruction) in the XTBA 300 indicates that the translated instruction A1 is valid. The XTBA 300 may monitor the value of the translation indicator associated with the page A and stored in the PhysMap. If the value of the translation indicator associated with the page A changes during execution of the translated instruction A1, execution of the translated instruction A1 may be aborted and may be sent to a handler to complete execution.

Additionally, the handler may generate snoops to all other XTBAs of the system, such as to each of the other XTBAs in the processor 100 of FIG. 1. Snoops to each of the other XTBAs in the system may result in update of the respective translation indicator corresponding to the translated instruction that is now stale. The snoops may result in aborting execution of the translated instruction in other cores and each core may send the translated instruction to a respective handler to complete execution.

Figure 4:
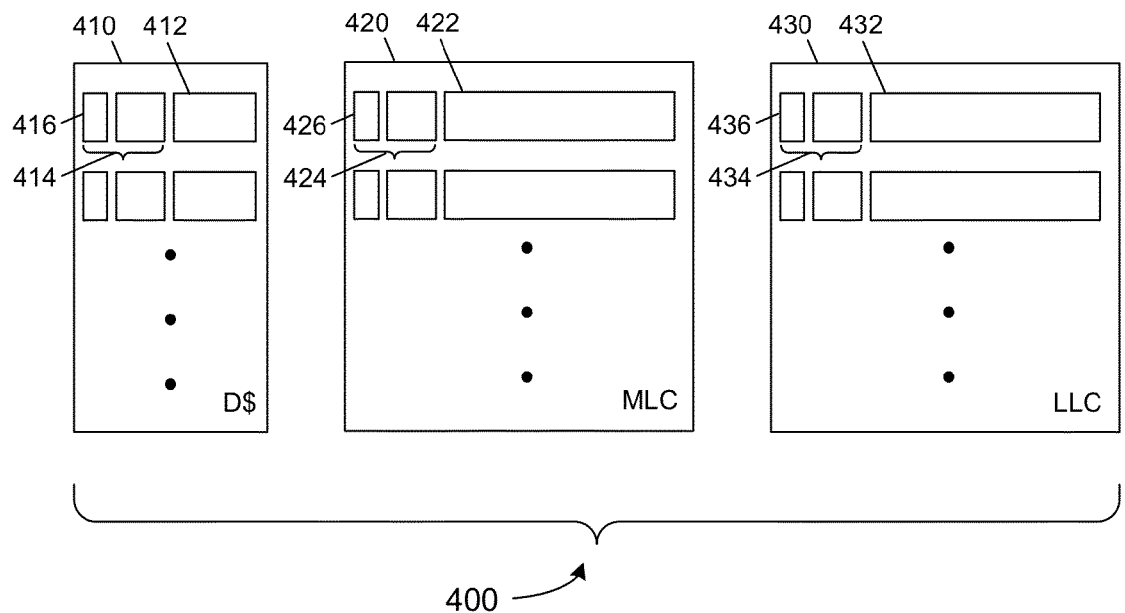
FIG. 4 is a block diagram of cache memories associated with a processor in accordance with an embodiment of the present invention.

Referring now to FIG. 4, shown is a block diagram depicting a set of data caches 400 associated with a processor, such as the processor 110 of FIG. 1. The set of data caches 400 includes a first level data cache 410, a second level data cache 420, and a third level data cache 430.

Each data cache may include a plurality of cache lines. Each cache line may include a data storage portion such as data storage portions 412, 422, and 432, each to store an operand, and a tag portion such as tag portions 414, 424, and 434. Each tag portion may include a corresponding stored translation indicator, such as translation indicators 416, 426, and 436. Each translation indicator in the tag portion may correspond to a translation indicator of a source page in memory from which the operand has been copied and placed in the data storage portion.

In one embodiment, a STORE instruction is to execute on an operand of a cache line whose translation indicator has a value that indicates the STORE is directed to the source page containing code that has been translated. Hence, execution of the STORE instruction would modify the contents of the source page. A processor to execute the STORE instruction may detect a conflict by reading the translation indicator value in the cache line, and may reset the translation indicator send the STORE instruction to a handler to resolve the impending conflict. Thus, the translation indicator stored in the cache line can serve as an indicator of a conflict, e.g., modification of a source code page containing instructions that have been translated.

Detection of the impending conflict associated with the STORE instruction can cause generation of an update of the corresponding translation indicator in the PhysMap from a first value to a second value. Update of the PhysMap can cause generation of snoops to all XTBAs of the system. Each snoop updates an associated translation indicator of a translated instruction in the XTBA of a core executing the translated instruction, to indicate that the translated instruction is stale. The snoops may also result in updates to the translation indicator values of cache lines associated with the source code page, e.g., cache lines whose contents are loaded from the source code page.

For example, in an embodiment, upon commencement of execution of first translated instruction at a processor an XTBA of the processor is to monitor the translation indicator of the source code page. Upon an indication that the translation indicator has been updated indicating modification of the source code page, the XTBA entry is updated, causing a fault that stops execution of the corresponding instruction that is now stale. Additionally, snoops can be generated to each of the caches in response to the indication of the updated translation indicator, which result in updates to each translation indicator in cache lines whose stored data is loaded from the source page. An updated translation indicator value in a particular cache line can indicate that the first translated instruction is not to be executed on the particular cache line, but instead is to be transferred to a handler to complete execution.

Figure 5:
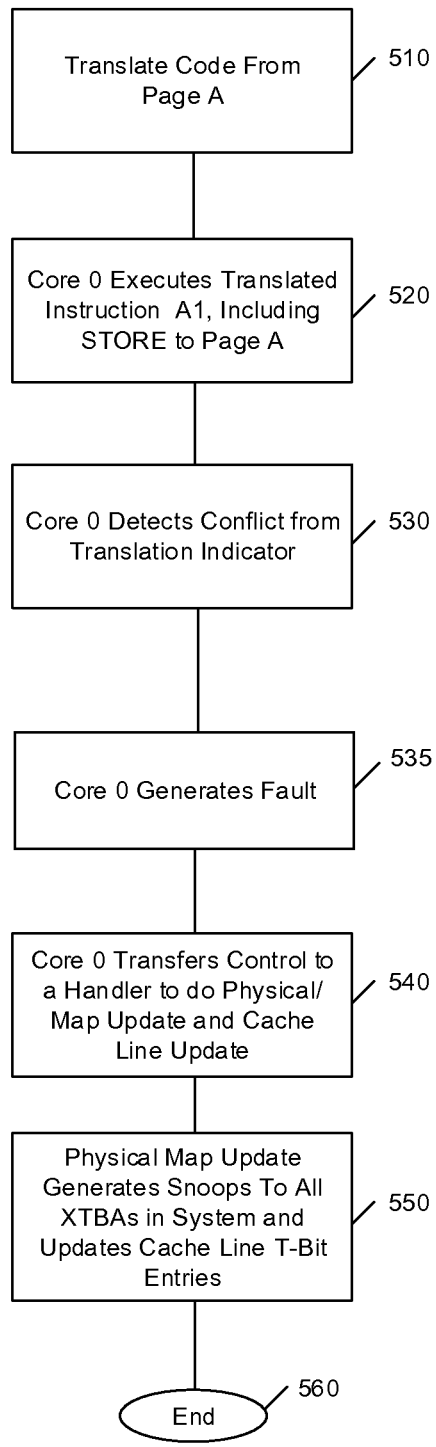
FIG. 5 is a flow diagram of a method of processing self modified code (SMC) in accordance with an embodiment of the present invention.

Referring now to FIG. 5, shown is a method 500 for responding to a conflict arising from execution of self modifying code. In an embodiment, the method 500 can be performed by a core, such as the processor 102 of FIG. 1.

Beginning with block 510, code stored in page A of a memory is translated, e.g., by binary translation from a first coding language to a second coding language. Continuing to block 520, a core 0 executes a translated instruction A1, including a STORE to page A. Moving to block 530, core 0 detects a conflict from a translation indicator value that indicates an intention to modify data stored in page A after translation of an instruction of page A, e.g., by executing the STORE to page A. Continuing to block 535, core 0 generates a fault in response to detection of the conflict. Proceeding to block 540, core 0 transfers control to a handler that updates a physical map (PhysMap) of the corresponding translation indicators and performs a cache line update of translation indicators in cache lines associated with core 0. Continuing to block 550, the update of the PhysMap is detected by an XTBA of core 0, causing a snoop to be generated to each XTBA in the system that updates the stored translation indicator value in each XTBA corresponding to a currently executing translated instruction. The updated value of the translated instruction indicates that the currently executing instruction is stale. Translation indicator values of cache line entries containing operands copied from page A of cache memories associated with other cores are also updated. The method 500 ends at block 560.

The method of FIG. 5 can be performed by hardware, software, firmware, or combinations thereof. While shown at a high level in the embodiment of FIG. 5, it is to be understood that the scope of the present invention is not so limited.

Figure 6:
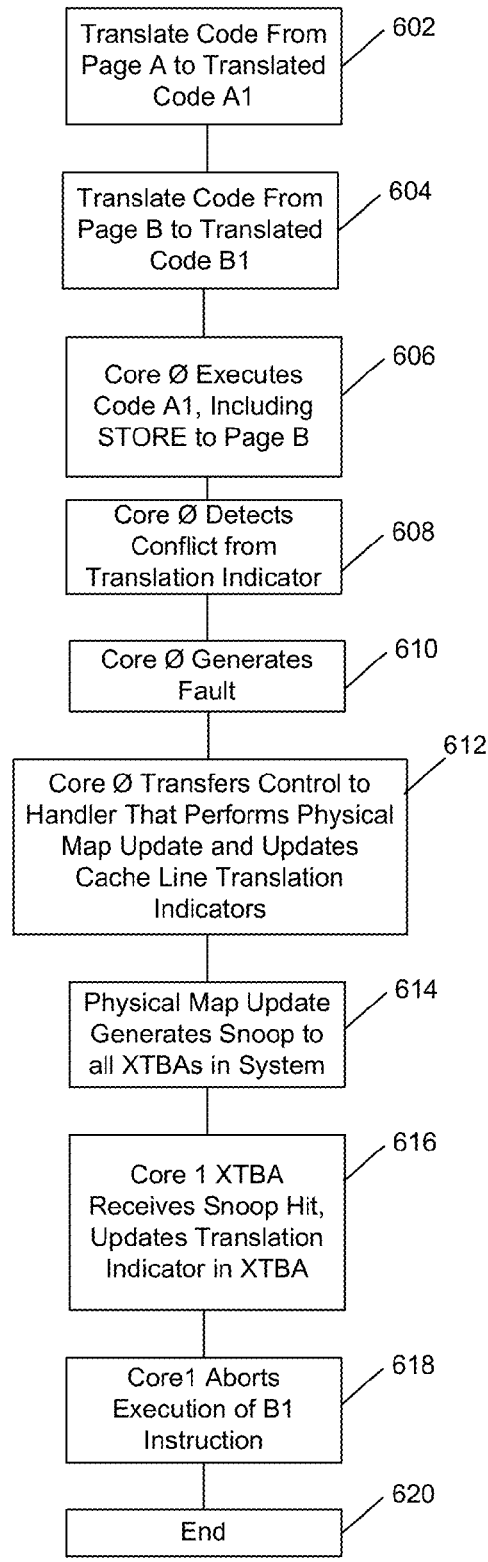
FIG. 6 is a flow diagram of a method of processing cross modified code (XMC) in accordance with an embodiment of the present invention.

Referring now to FIG. 6, shown is a method 600 for responding to a conflict arising from execution of cross modifying code. Beginning at block 602, code stored in page A of a memory, such as a DRAM, is translated (binary translation) to code A1. The translation may be accomplished by a core in a system such as the system shown in FIG. 1, or may be translated by a separate binary translation processor. Continuing to block 604, code stored in page B of the memory is translated to code B1. Advancing to block 606, a core 0 begins execution of the translated instruction A1, including a STORE to page B of the memory. Moving to block 608, the core 0 detects, from the translation indicator value, a conflict due to an attempt to store data to page B that includes code that has been translated. Proceeding to block 610, core 0 generates a fault in response to detection of the conflict.

Continuing to block 612, core 0 transfers control to a handler that is to update a physical map of translation indicators (e.g., PhysMap 170 of FIG. 1) and is also to update cache line translation indicator values.

Advancing to block 614, the update of the PhysMap generates snoops to all XTBAs in the system. Moving to block 616, the XTBA in core 1 receives a snoop hit, which generates a fault in core 1. Proceeding to block 618, core 1 aborts execution of the translated instruction B1 in response to the corresponding updated translation indicator value in the associated XTBA. The method ends at block 620.

The method of FIG. 6 can be performed by hardware, software, firmware, or combinations thereof. While shown at a high level in the embodiment of FIG. 6, it is to be understood that the scope of the present invention is not so limited.

Figure 7:
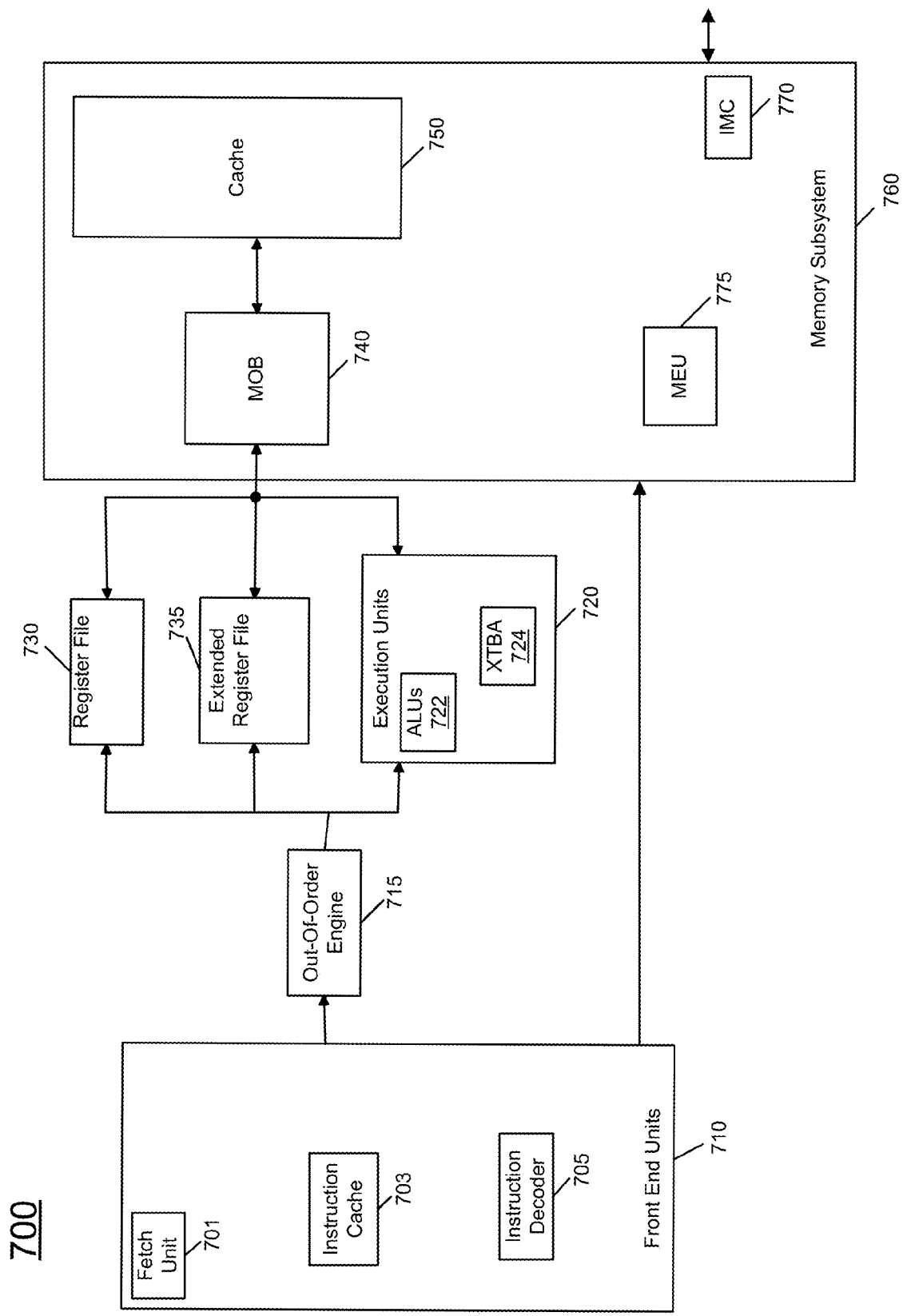
FIG. 7 is a block diagram of a processor core in accordance with one embodiment of the present invention.

Embodiments can be implemented in many different systems. For example, embodiments can be realized in a processor such as a multicore processor. Referring now to FIG. 7, shown is a block diagram of a processor core in accordance with one embodiment of the present invention. As shown in FIG. 7, core 700 may be one core of a multicore processor, and is shown as a multi-stage pipelined out-of-order processor. Processor core 700 is shown with a relatively simplified view in FIG. 7 to illustrate various features used in connection with data error correction in accordance with an embodiment of the present invention.

As shown in FIG. 7, core 700 includes front end units 710, which may be used to fetch instructions to be executed and prepare them for use later in the processor. For example, front end units 710 may include a fetch unit 701, an instruction cache 703, and an instruction decoder 705. In some implementations, front end units 710 may further include a trace cache, along with microcode storage as well as a micro-operation storage. Fetch unit 701 may fetch macro-instructions, e.g., from memory or instruction cache 703, and feed them to instruction decoder 705 to decode them into primitives, i.e., micro-operations for execution by the processor.

Coupled between front end units 710 and execution units 720 is an out-of-order (OOO) engine 715 that may be used to receive the micro-instructions and prepare them for execution. More specifically OOO engine 715 may include various buffers to re-order micro-instruction flow and allocate various resources needed for execution, as well as to provide renaming of logical registers onto storage locations within various register files such as register file 730 and extended register file 735 such as by using renaming logic of the engine. Register file 730 may include separate register files for integer and floating point operations. Extended register file 735 may provide storage for vector-sized units, e.g., 256 or 512 bits per register.

Various resources may be present in execution units 720, including, for example, various integer, floating point, and single instruction multiple data (SIMD) logic units, among other specialized hardware. For example, such execution units may include one or more arithmetic logic units (ALUs) 722. Of course other execution units such as multiply-accumulate units and so forth may further be present.

In some embodiments, one or more of the execution units 720 may include an XTBA 724 to cache translation indicator values, as described herein. Each of the execution units 720 may include one or more data caches (not shown) that may store a plurality of entries and each entry may include metadata that may include a translation indicator, as described herein.

Results of the execution units 720 may be provided to a retirement logic, which may be implemented within a memory subsystem 760 of the processor. Various processor structures including execution units and front end logic, for example, may be coupled to a memory subsystem 760. This memory subsystem may provide an interface between processor structures and further portions of a memory hierarchy, e.g., an on or off-chip cache and a system memory. As seen the subsystem has various components including a memory order buffer (MOB) 740. More specifically, MOB 740 may include various arrays and logic to receive information associated with instructions that are executed. This information is then examined by MOB 740 to determine whether the instructions can be validly retired and result data committed to the architectural state of the processor, or whether one or more exceptions occurred that prevent a proper retirement of the instructions. Of course, MOB 740 may handle other operations associated with retirement.

As shown in FIG. 7, MOB 740 is coupled to a cache 750 which, in one embodiment may be a low level cache (e.g., an L1 cache). Memory subsystem 760 also may include an integrated memory controller 770 to provide for communication with a system memory (not shown for ease of illustration in FIG. 7). Memory subsystem 760 may further include a memory execution unit (MEU) 775 that handles various operations to initiate memory requests and handle return of data from memory. Further, while not shown understand that other structures such as buffers, schedulers and so forth may be present in the MEU 775.

From memory subsystem 760, data communication may occur with higher level caches, system memory and so forth. While shown with this high level in the embodiment of FIG. 7, understand the scope of the present invention is not limited in this regard. For example, while the implementation of FIG. 7 is with regard to an out-of-order machine such as of a so-called x86 instruction set architecture (ISA) architecture, the scope of the present invention is not limited in this regard. That is, other embodiments may be implemented in an in-order processor, a reduced instruction set computing (RISC) processor such as an ARM-based processor, or a processor of another type of ISA that can emulate instructions and operations of a different ISA via an emulation engine and associated logic circuitry.

That is, in other embodiments, a processor architecture may include emulation features such that the processor can execute instructions of a first ISA, referred to as a source ISA, where the architecture is according to a second ISA, referred to as a target ISA. In general, software, including both the OS and application programs, is compiled to the source ISA, and hardware implements the target ISA designed specifically for a given hardware implementation with special performance and/or energy efficiency features.

Figure 8:
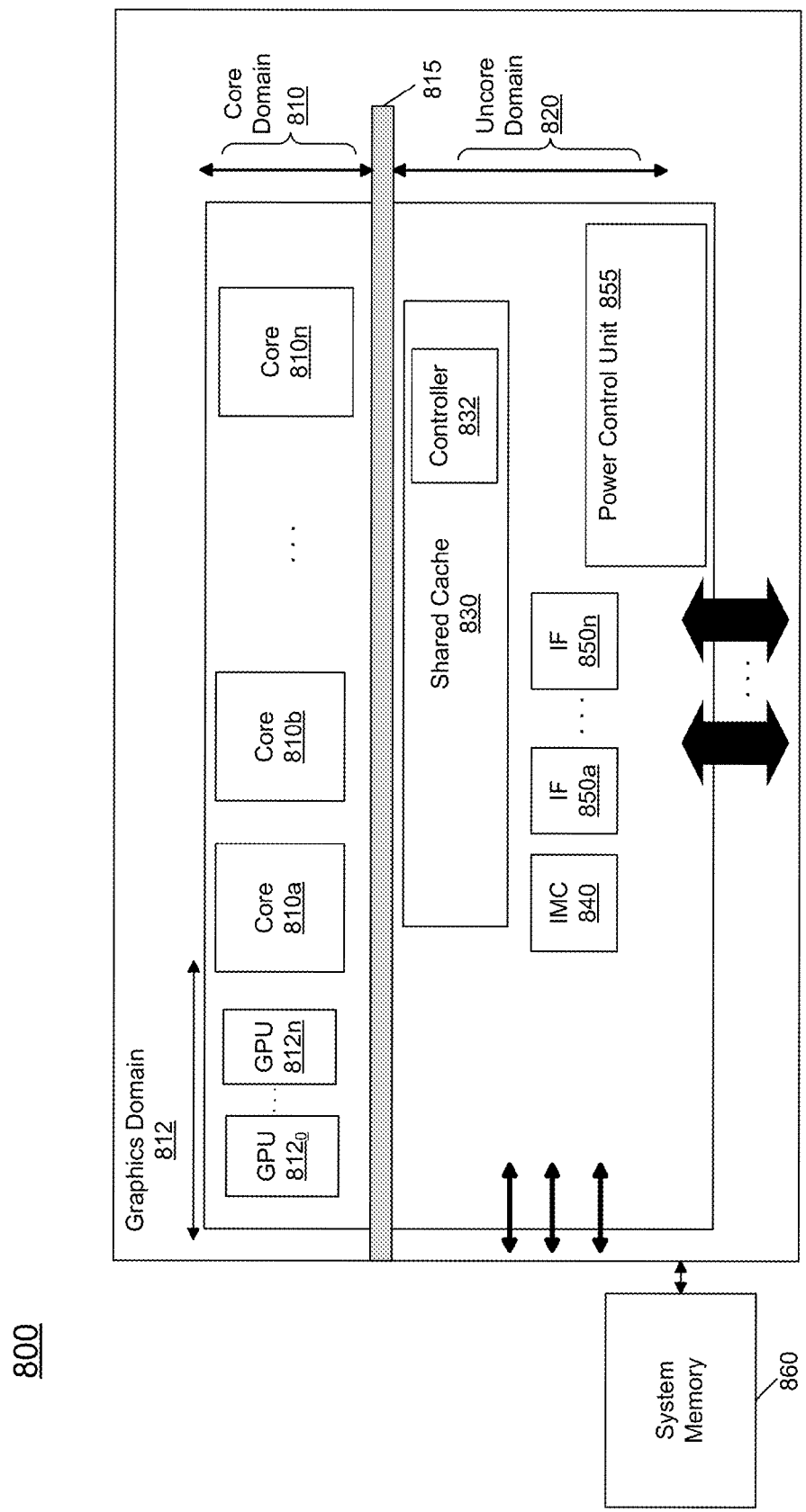
FIG. 8 is a block diagram of a processor in accordance with an embodiment of the present invention.

Referring now to FIG. 8, shown is a block diagram of a processor in accordance with an embodiment of the present invention. As shown in FIG. 8, processor 800 may be a multicore processor including a plurality of cores $810_a$-$810_n$ in a core domain 810. One or more of the cores $810_a$-$810_n$ may include an XTBA (not shown), as described herein, and a data cache in which each cache line may include metadata that may include a translation indictor, as described herein. As further shown in FIG. 8, one or more graphics processing units (GPUs) $812_0$-$812_n$ may be present in a graphics domain 812. Each of these independent graphics engines also may be configured to operate at independent voltage and/or frequency or may be controlled together as a single domain. These various compute elements may be coupled via an interconnect 815 to a system agent or uncore 820 that includes various components. As seen, the uncore 820 may include a shared cache 830 which may be a last level cache. The shared cache 830 may include a plurality of entries, and each cache entry may include metadata that may include a translation indicator associated with data stored in the cache entry, as described herein and a data cache. One or more of the caches may store a plurality of entries and each entry may include metadata that may include a translation indicator, as described herein. The uncore may also include a physical map cache (PM$), as described herein.

With further reference to FIG. 8, processor 800 may communicate with a system memory 860, e.g., via a memory bus. In addition, by interfaces 850, connection can be made to various off-chip components such as peripheral devices, mass storage and so forth. While shown with this particular implementation in the embodiment of FIG. 8, the scope of the present invention is not limited in this regard.

Figure 9:
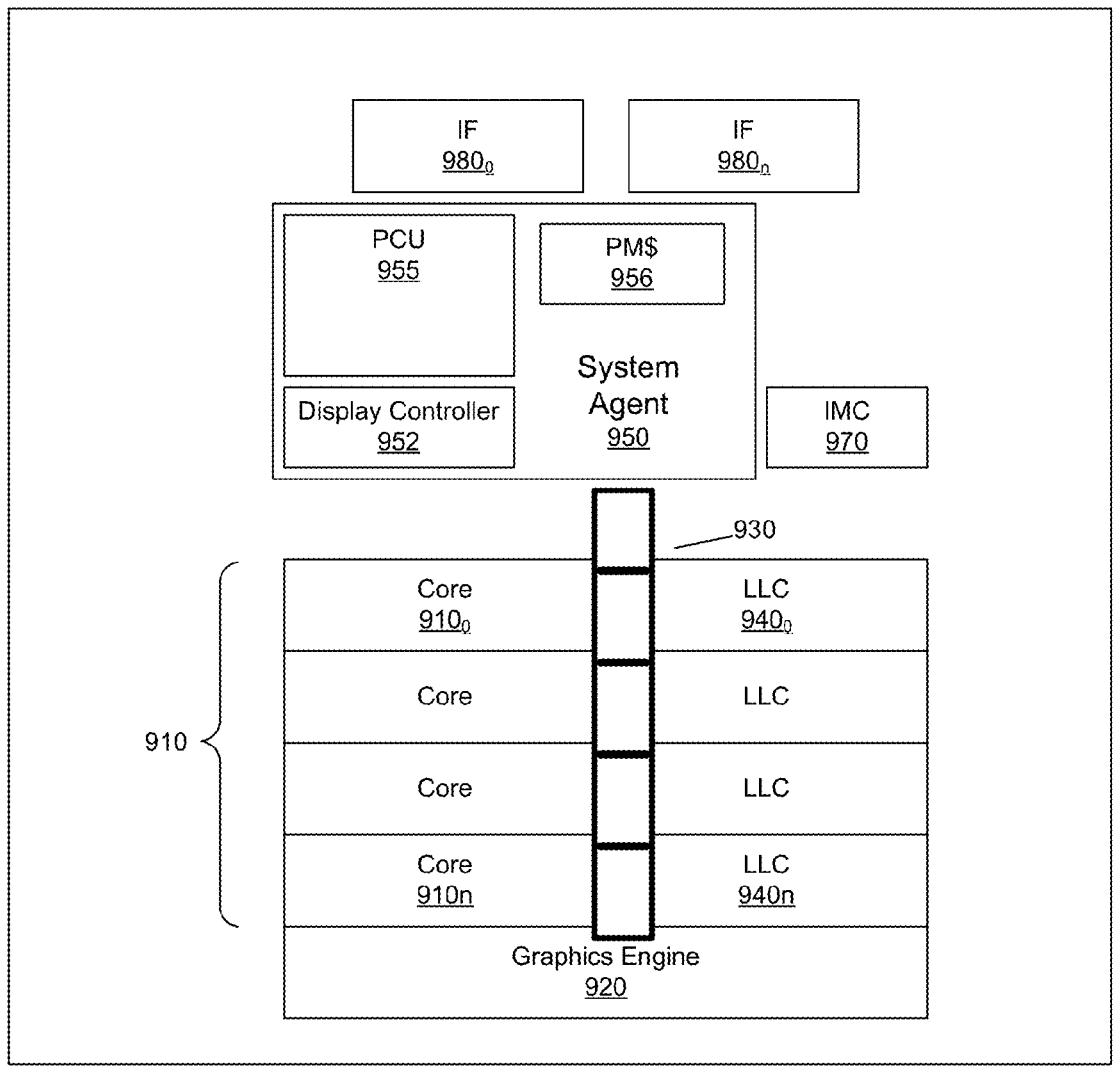
FIG. 9 is a block diagram of a multi-domain processor in accordance with another embodiment of the present invention.

Referring now to FIG. 9, shown is a block diagram of a multi-domain processor in accordance with another embodiment of the present invention. As shown in the embodiment of FIG. 9, processor 900 includes multiple domains. Specifically, a core domain 910 can include a plurality of cores $910_0$-$910_n$, a graphics domain 920 can include one or more graphics engines, and a system agent domain 950 may further be present. In various embodiments, system agent domain 950 may remain powered on at all times to handle power control events and power management such that domains 910 and 920 can be controlled to dynamically enter into and exit low power states.

Note that while only shown with three domains, understand the scope of the present invention is not limited in this regard and additional domains can be present in other embodiments. For example, multiple core domains may be present, each including at least one core.

In general, one or more of the cores 910 may further include a corresponding XTBA, as described herein, and low level caches in addition to various execution units and additional processing elements. A low level cache may include a plurality of entries and each cache entry may include a translation indicator, as described herein. In turn, the various cores may be coupled to each other and to a shared cache memory formed of a plurality of units of a last level cache (LLC) $940_0$-$940_n$. In various embodiments, LLC 940 may be shared amongst the cores and the graphics engine, as well as various media processing circuitry. As seen, a ring interconnect 930 thus couples the cores together, and provides interconnection between the cores, graphics domain 920 and system agent circuitry 950.

In the embodiment of FIG. 9, system agent domain 950 may include display controller 952 which may provide control of and an interface to an associated display. As further seen, system agent domain 950 may include a power control unit 955. The system agent domain 950 may also include a physical map cache (PM$) 956 to store a portion of translation indicator values that are stored in a physical map (Phys-Map) of translation indicator values within a system memory.

As further seen in FIG. 9, processor 900 can further include an integrated memory controller (IMC) 970 that can provide for an interface to the system memory (such as a DRAM). Multiple interfaces $980_0$-$980_n$ may be present to enable interconnection between the processor and other circuitry. For example, in one embodiment at least one direct media interface (DMI) interface may be provided as well as one or more Peripheral Component Interconnect Express (PCI Express™ (PCIe™)) interfaces. Still further, to provide for communications between other agents such as additional processors or other circuitry, one or more interfaces in accordance with a Intel® Quick Path Interconnect (QPI) protocol may also be provided. Although shown at this high level in the embodiment of FIG. 9, understand the scope of the present invention is not limited in this regard.

Figure 10:
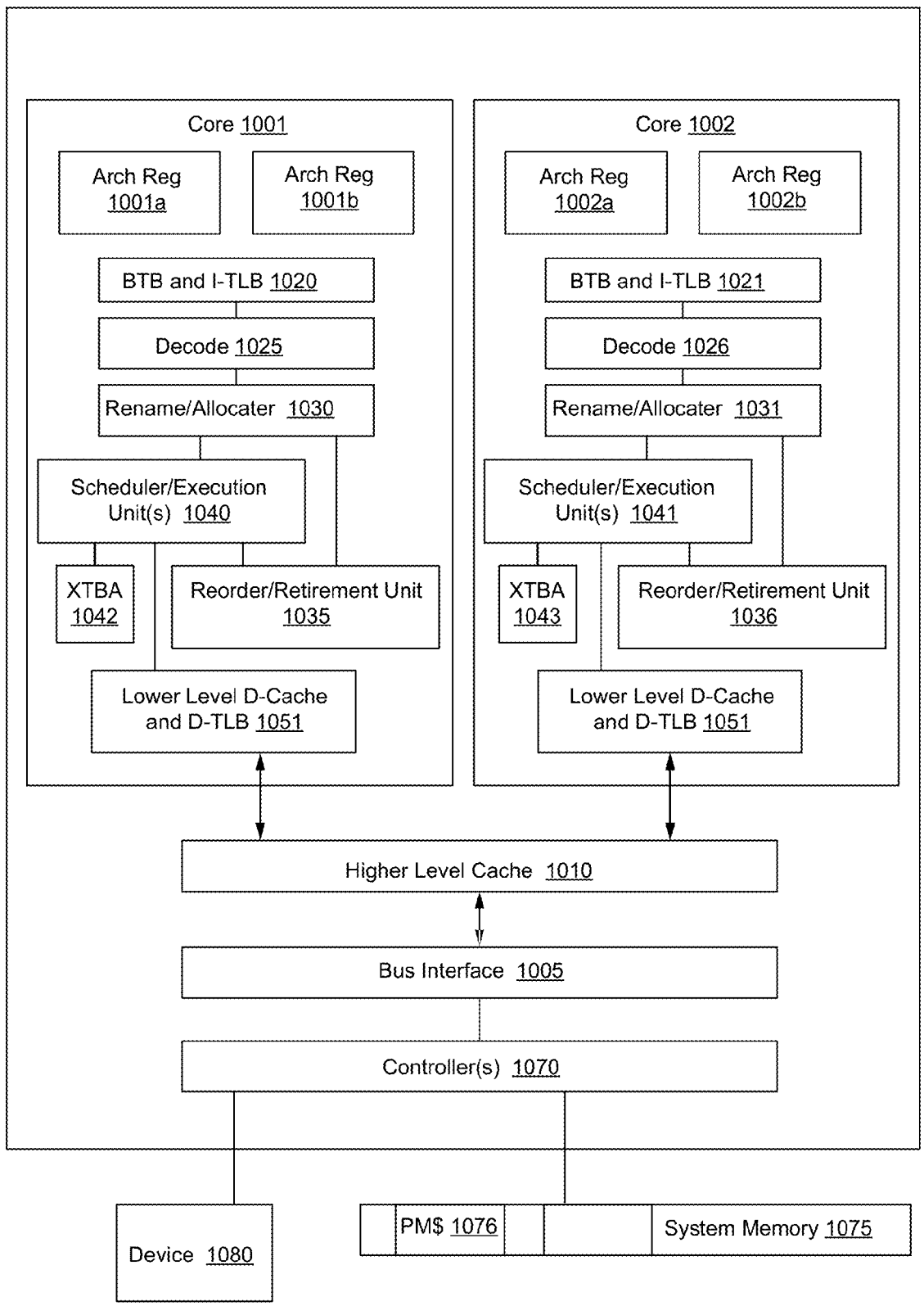
FIG. 10 is a block diagram of an embodiment of a processor including multiple cores.

Referring to FIG. 10, an embodiment of a processor including multiple cores is illustrated. Processor 1000 includes any processor or processing device, such as a microprocessor, an embedded processor, a digital signal processor (DSP), a network processor, a handheld processor, an application processor, a co-processor, a system on a chip (SOC), or other device to execute code. Processor 1000, in one embodiment, includes at least two cores—cores 1001 and 1002, which may include asymmetric cores or symmetric cores (the illustrated embodiment). However, processor 1000 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 1000, as illustrated in FIG. 10, includes two cores, cores 1001 and 1002. Here, cores 1001 and 1002 are considered symmetric cores, i.e., cores with the same configurations, functional units, and/or logic. In another embodiment, core 1001 includes an out-of-order processor core, while core 1002 includes an in-order processor core. However, cores 1001 and 1002 may be individually selected from any type of core, such as a native core, a software managed core, a core adapted to execute a native instruction set architecture (ISA), a core adapted to execute a translated ISA, a co-designed core, or other known core. Yet to further the discussion, the functional units illustrated in core 1001 are described in further detail below, as the units in core 1002 operate in a similar manner.

As depicted, core 1001 includes two hardware threads 1001$a$ and 1001$b$, which may also be referred to as hardware thread slots 1001$a$ and 1001$b$. Therefore, software entities, such as an operating system, in one embodiment potentially view processor 1000 as four separate processors, i.e., four logical processors or processing elements capable of executing four software threads concurrently. As alluded to above, a first thread is associated with architecture state registers 1001$a$, a second thread is associated with architecture state registers 1001$b$, a third thread may be associated with architecture state registers 1002a, and a fourth thread may be associated with architecture state registers 1002b. Here, each of the architecture state registers (1001a, 1001b, 1002a, and 1002b) may be referred to as processing elements, thread slots, or thread units, as described above. As illustrated, architecture state registers 1001a are replicated in architecture state registers 1001b, so individual architecture states/contexts are capable of being stored for logical processor 1001a and logical processor 1001b. In core 1001, other smaller resources, such as instruction pointers and renaming logic in allocator and renamer block 1030 may also be replicated for threads 1001a and 1001b. Some resources, such as re-order buffers in reorder/retirement unit 1035, ILTB 1020, load/store buffers, and queues may be shared through partitioning. Other resources, such as general purpose internal registers, page-table base register(s), low-level data-cache and data-TLB 1015, execution unit(s) 1040, and portions of out-of-order unit 1035 are potentially fully shared.

Processor 1000 often includes other resources, which may be fully shared, shared through partitioning, or dedicated by/to processing elements. In FIG. 10, an embodiment of a purely exemplary processor with illustrative logical units/resources of a processor is illustrated. Note that a processor may include, or omit, any of these functional units, as well as include any other known functional units, logic, or firmware not depicted. For example, each core may include an XTBA as described herein. As illustrated, core 1001 includes a simplified, representative out-of-order (OOO) processor core. But an in-order processor may be utilized in different embodiments. The OOO core includes a branch target buffer 1020 to predict branches to be executed/taken and an instruction-translation buffer (I-TLB) 1020 to store address translation entries for instructions.

Core 1001 further includes decode module 1025 coupled to fetch unit 1020 to decode fetched elements. Fetch logic, in one embodiment, includes individual sequencers associated with thread slots 1001a, 1001b, respectively. Usually core 1001 is associated with a first ISA, which defines/specifies instructions executable on processor 1000. Often machine code instructions that are part of the first ISA include a portion of the instruction (referred to as an opcode), which references/specifies an instruction or operation to be performed. Decode logic 1025 includes circuitry that recognizes these instructions from their opcodes and passes the decoded instructions on in the pipeline for processing as defined by the first ISA. For example, decoders 1025, in one embodiment, include logic designed or adapted to recognize specific instructions, such as transactional instruction. As a result of the recognition by decoders 1025, the architecture or core 1001 takes specific, predefined actions to perform tasks associated with the appropriate instruction. It is important to note that any of the tasks, blocks, operations, and methods described herein may be performed in response to a single or multiple instructions; some of which may be new or old instructions.

In one example, allocator and renamer block 1030 includes an allocator to reserve resources, such as register files to store instruction processing results. However, threads 1001a and 1001b are potentially capable of out-of-order execution, where allocator and renamer block 1030 also reserves other resources, such as reorder buffers to track instruction results. Unit 1030 may also include a register renamer to rename program/instruction reference registers to other registers internal to processor 1000. Reorder/retirement unit 1035 includes components, such as the reorder buffers mentioned above, load buffers, and store buffers, to support out-of-order execution and later in-order retirement of instructions executed out-of-order.

Scheduler and execution unit(s) block 1040, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 1051 are coupled to execution unit(s) 1040, 1041. The data cache is to store recently used/operated on elements, such as data operands, which are potentially held in memory coherency states. The D-TLB 1051 is to store recent virtual/linear to physical address translations. As a specific example, a processor may include a page table structure to break physical memory into a plurality of virtual pages. Each data cache may store a plurality of entries and each entry may include metadata that may include a translation indicator, as described herein.

Here, cores 1001 and 1002 share access to higher-level or further-out cache 1010, which is to cache recently fetched elements. Each further out cache 1010 cache may store a plurality of entries and each entry may include metadata that may include a translation indicator, as described herein. Note that higher-level or further-out refers to cache levels increasing or getting further away from the execution unit(s). In one embodiment, higher-level cache 1010 is a last-level data cache—last cache in the memory hierarchy on processor 1000—such as a second or third level data cache. However, higher level cache 1010 is not so limited, as it may be associated with or includes an instruction cache. A trace cache—a type of instruction cache—instead may be coupled after decoder 1025 to store recently decoded traces.

In the depicted configuration, processor 1000 also includes bus interface module 1005. Historically, controller 1070 has been included in a computing system external to processor 1000. In this scenario, bus interface 1005 is to communicate with devices external to processor 1000, such as system memory 1075, a chipset (often including a memory controller hub to connect to memory 1075 and an I/O controller hub to connect peripheral devices), a memory controller hub, a physical map cache (PM$) as described herein, a northbridge, or other integrated circuit. And in this scenario, bus 1005 may include any known interconnect, such as multi-drop bus, a point-to-point interconnect, a serial interconnect, a parallel bus, a coherent (e.g. cache coherent) bus, a layered protocol architecture, a differential bus, and a GTL bus.

Memory 1075 may be dedicated to processor 1000 or shared with other devices in a system. Common examples of types of memory 1075 include DRAM, SRAM, non-volatile memory (NV memory), and other known storage devices. Note that device 1080 may include a graphic accelerator, processor or card coupled to a memory controller hub, data storage coupled to an I/O controller hub, a wireless transceiver, a flash device, an audio controller, a network controller, or other known device.

Note however, that in the depicted embodiment, the controller 1070 is illustrated as part of processor 1000. Recently, as more logic and devices are being integrated on a single die, such as SOC, each of these devices may be incorporated on processor 1000. For example in one embodiment, memory controller hub 1070 is on the same package and/or die with processor 1000. Here, a portion of the core (an on-core portion) includes one or more controller(s) 1070 for interfacing with other devices such as memory 1075 or a graphics device 1080. The configuration including an interconnect and controllers for interfacing with such devices is often referred to as an on-core (or un-core configuration). As an example, bus interface 1005 includes a ring interconnect with a memory controller for interfacing with memory 1075 and a graphics controller for interfacing with graphics processor 1080. Yet, in the SOC environment, even more devices, such as the network interface, co-processors, memory 1075, graphics processor 1080, and any other known computer devices/interface may be integrated on a single die or integrated circuit to provide small form factor with high functionality and low power consumption.

Figure 11:
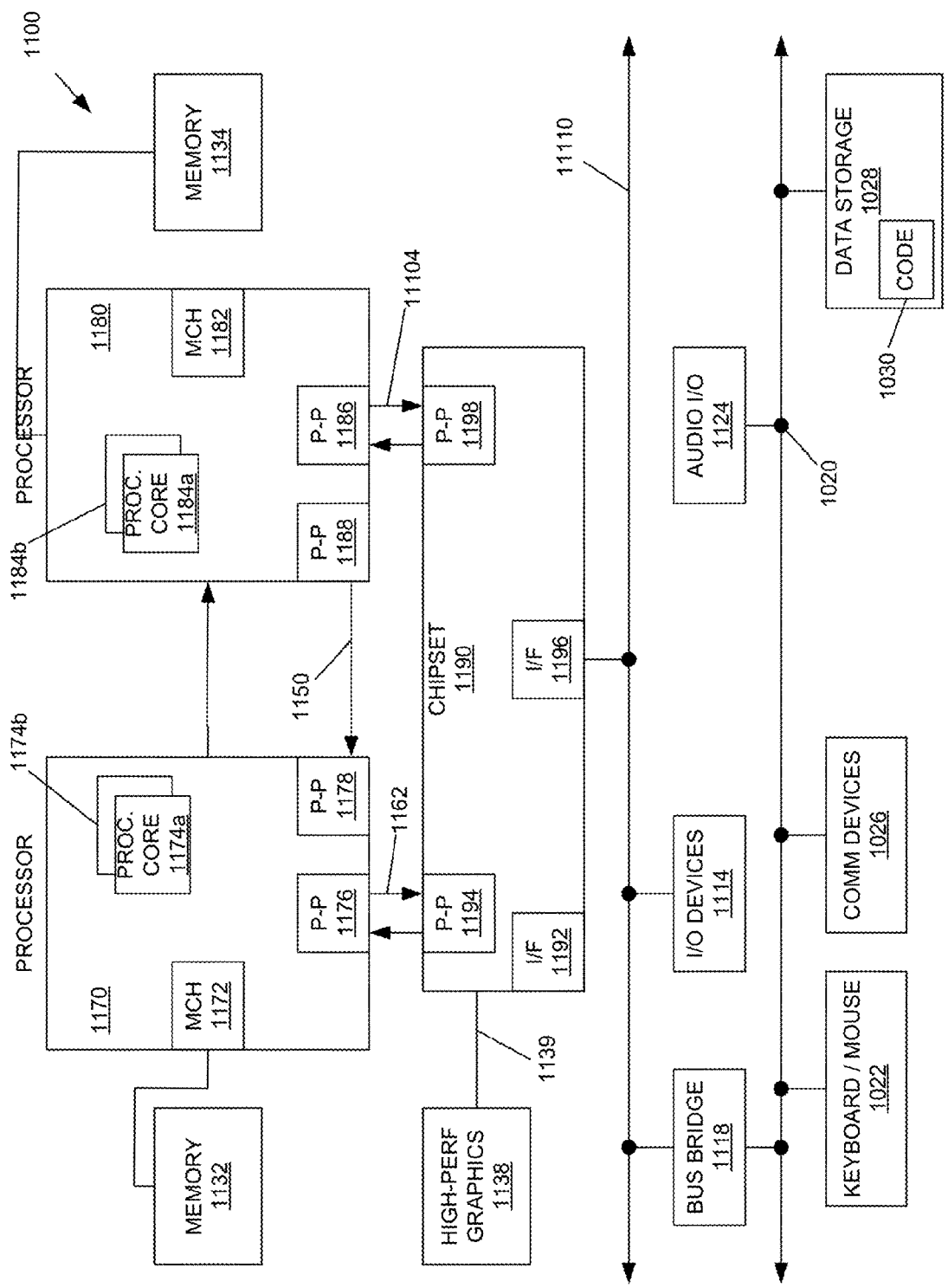
FIG. 11 is a block diagram of a system in accordance with an embodiment of the present invention.

Embodiments may be implemented in many different system types. Referring now to FIG. 11, shown is a block diagram of a system in accordance with an embodiment of the present invention. As shown in FIG. 11, multiprocessor system 1100 is a point-to-point interconnect system, and includes a first processor 1170 and a second processor 1180 coupled via a point-to-point interconnect 1150. As shown in FIG. 11, each of processors 1170 and 1180 may be multicore processors, including first and second processor cores (i.e., processor cores 1174a and 1174b and processor cores 1184a and 1184b), although potentially many more cores may be present in the processors. One or more of the processors may include an XTBA, as described herein, and a respective cache. One or more of the caches may store a plurality of entries and each entry may include metadata that may include a translation indicator, as described herein.

Still referring to FIG. 11, first processor 1170 further includes a memory controller hub (MCH) 1172 and point-to-point (P-P) interfaces 1176 and 1178. Similarly, second processor 1180 includes a MCH 1182 and P-P interfaces 1186 and 1188. As shown in FIG. 11, MCH's 1172 and 1182 couple the processors to respective memories, namely a memory 1132 and a memory 1134, which may be portions of system memory (e.g., DRAM) locally attached to the respective processors. First processor 1170 and second processor 1180 may be coupled to a chipset 1190 via P-P interconnects 1152 and 1154, respectively. As shown in FIG. 11, chipset 1190 includes P-P interfaces 1194 and 1198. Each processor may have access to a physical map cache (PM$) (not shown), as described herein.

Furthermore, chipset 1190 includes an interface 1192 to couple chipset 1190 with a high performance graphics engine 1138, by a P-P interconnect 1139. In turn, chipset 1190 may be coupled to a first bus 1116 via an interface 1196. As shown in FIG. 11, various input/output (I/O) devices 1114 may be coupled to first bus 1116, along with a bus bridge 1118 which couples first bus 1116 to a second bus 1120. Various devices may be coupled to second bus 1120 including, for example, a keyboard/mouse 1122, communication devices 1126 and a data storage unit 1128 such as a disk drive or other mass storage device which may include code 1130, in one embodiment. Further, an audio I/O 1124 may be coupled to second bus 1120. Embodiments can be incorporated into other types of systems including mobile devices such as a smart cellular telephone, Ultrabook™, tablet computer, netbook, or so forth.

Embodiments may be implemented in code and may be stored on a non-transitory storage medium having stored thereon instructions which can be used to program a system to perform the instructions. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A processor comprising:
   a processor core to execute a first translated instruction that is to be translated from a first instruction stored in a first page of a memory; and
   a translation indicator agent (XTBA) comprising a cache memory to include one or more fields, each field to store a corresponding translation indicator to include a first field to store a first translation indicator that is to be read from a physical map (PhysMap) and that is to indicate whether the first page of the memory has been modified subsequent to translation of the first instruction.

2. The processor of claim 1, wherein the first translation indicator to be stored in the XTBA is to be updated in response to an indication that the first page has been modified.

3. The processor of claim 2, wherein in response to update of the first translation indicator while the first translated instruction is executed, the processor is to abort execution of the first translated instruction.

4. The processor of claim 1, wherein the processor is to update the XTBA in response to an update of the first translation indicator in the PhysMap.

5. The processor of claim 4, wherein the processor is to monitor the first translation indicator to be stored in the PhysMap during a monitoring time from a start of execution of the first translated instruction until a commit stage of the first translated instruction.

6. The processor of claim 1, wherein each translation indicator in the XTBA is associated with a corresponding page of the memory.

7. The processor of claim 6, wherein the XTBA is to be physically tagged to enable a snoop responsive to an update to the PhysMap.

8. The processor of claim 7, wherein the processor core is to update the first translation indicator stored in the XTBA in response to an indication received via the snoop, the update to indicate that contents of the first page have been modified after the first instruction is translated.

9. The processor of claim 1, wherein each translation indicator is to include a corresponding binary value to indicate whether a corresponding page of the memory has been modified after a corresponding instruction stored in the corresponding page is translated.

10. The processor of claim 1, wherein upon translation of the first instruction, the first translation indicator is to be set to a first binary value, and upon modification of the first page after translation of the first instruction, the first translation indicator is to be set to a second binary value.

11. The processor of claim 1, wherein in response to an indication from the translation indicator that the first page has been modified subsequent to translation of the first instruction, the processor is to be interrupted from completion of execution of the first translated instruction.

12. The processor of claim 1, further comprising a cache coupled to the processor, wherein the cache is to include a plurality of cache lines and at least one cache line is to store an operand to be loaded from the first page and a corresponding translation indicator associated with the first page, wherein the translation indicator within the at least one cache line is updatable in response to a change in a corresponding translation indicator within the PhysMap.

13. A processor comprising:
a processor core; and
a cache memory coupled to the processor core, the cache memory comprising one or more entries, each entry comprising:
a data storage field to store an operand to be loaded from a first page of a memory, wherein the first page is to include includes a first instruction that has been translated into a first translated instruction; and
a translation field to store a first translation indicator associated with the first page to indicate whether the first page has been modified after translation of the first instruction.

14. The processor of claim 13, wherein the first translation indicator comprises a binary value that is to indicate whether the first page has been modified after the translation of the first page.

15. The processor of claim 13, wherein the cache memory is to receive an updated first translation indicator in response to a write to the first page and the updated first translation indicator is to cause the processor core to generate a fault in response to detection of a store command to be executed on the operand of the entry.

16. The processor of claim 13, wherein the cache memory is to receive an updated first translation indicator in response to a write to the first page and the updated first translation indicator is to cause the processor core to invalidate the first translated instruction.

17. A system comprising:
a system memory that includes a physical map (PhysMap) to store a plurality of translation indicators, each translation indicator to be stored in a corresponding field of the PhysMap, each translation indicator corresponding to a page of the system memory and each field distinct from the corresponding page, each translation indicator to indicate whether the corresponding page includes an instruction that has been translated; and
a processor including a processor core to execute a first translated instruction translated from a first instruction, and a physical map cache to store a subset of the translation indicators stored in the PhysMap of the system memory, wherein in response to execution of a write command to the first page after translation of the first instruction, a value of a first translation indicator in the physical map cache is to be updated from a first value to a second value and the processor core is to generate a fault associated with execution of the first translated instruction responsive to the second value of the first translation indicator.

18. The system of claim 17, wherein the processor core is to transfer execution control to a handler that is to invalidate the first translated instruction.

19. The system of claim 17, wherein the processor core is to update the value of the first translation indicator in the PhysMap from a first binary value to a second binary value in response to the execution of the write command to the first page after translation of the first instruction, and to store the second binary value of the first translation indicator in the physical map cache.

20. A method comprising:
executing by a first core, translated first code that is translated from first code stored in a first page of a memory, wherein the translated first code is to include a store instruction to be directed to a second page of the memory, the second page to store second code;
executing, by a second core, translated second code that includes a translated second instruction that is translated from the second code in the second page, wherein translation of a second instruction is to occur prior to execution of the translated first code; and
detecting a conflict in response to execution by the first core of the store instruction to the second page by reading a value of a translation indicator associated with the second page, the translation indicator to be stored in a physical map (PhysMap) of the memory that is distinct from the first page and from the second page of the memory.

21. The method of claim 20, further comprising generating a fault associated with execution of the translated second code.

22. The method of claim 20, further comprising generating a snoop in response to detection of the conflict, the snoop to update a translation indicator agent (XTBA) entry of an XTBA cache of the second core, wherein an updated XTBA entry is to indicate that the translated second instruction is stale.

23. The method of claim 22, further comprising transferring execution control to a handler that is to invalidate the second translated instruction in response to detection that the XTBA entry is updated.

24. The method of claim 20, wherein the value of the translation indicator is to be changed from a first binary value prior to execution of the store instruction, to a second binary value responsive to the execution of the store instruction.

* * * * *